US010406442B2

(12) United States Patent
Anderson et al.

(10) Patent No.: US 10,406,442 B2
(45) Date of Patent: Sep. 10, 2019

(54) SYSTEM AND METHOD FOR MANAGING DYNAMIC OPT-IN EXPERIENCES IN A VIRTUAL ENVIRONMENT

(71) Applicant: Cognant LLC, Mountain View, CA (US)

(72) Inventors: Ethan Anderson, Mountain View, CA (US); Yonatan Ellert, Sunnyvale, CA (US); Rohan Verma, Mountain View, CA (US); Sophia Cao, San Leandro, CA (US); Matt Holland, Palo Alto, CA (US)

(73) Assignee: Cognant LLC, Mountain View, CA (US)

( * ) Notice: Subject to any disclaimer, the term of this patent is extended or adjusted under 35 U.S.C. 154(b) by 0 days.

(21) Appl. No.: 15/855,177

(22) Filed: Dec. 27, 2017

(65) Prior Publication Data

US 2018/0207533 A1 Jul. 26, 2018

Related U.S. Application Data

(60) Provisional application No. 62/474,843, filed on Mar. 22, 2017, provisional application No. 62/449,851, filed on Jan. 24, 2017.

(51) Int. Cl.
*A63F 13/45* (2014.01)
*A63F 13/69* (2014.01)
(Continued)

(52) U.S. Cl.
CPC .............. *A63F 13/69* (2014.09); *A63F 13/23* (2014.09); *A63F 13/33* (2014.09); *A63F 13/48* (2014.09);
(Continued)

(58) Field of Classification Search
CPC .......... A63F 13/69; A63F 13/23; A63F 13/48; A63F 2300/1025; A63F 13/33; A63F 13/49; A63F 13/67; A63F 2300/535
(Continued)

(56) References Cited

U.S. PATENT DOCUMENTS 5,848,396 A 12/1998 Gerace
6,227,969 B1 5/2001 Yoseloff
(Continued)

OTHER PUBLICATIONS

O'Kane, Ciaran, "King: Testing New Reward Video Ad Format to Monetise 400+ Million Users", dated May 27, 2016. https://www.exchangewire.com/blog/2016/05/27/king-testing-new-reward-video-ad-format-to-monetise-400-million-users/.*
(Continued)

*Primary Examiner* — Allen Chan
(74) *Attorney, Agent, or Firm* — Goodwin Procter LLP

(57) ABSTRACT

Implementations of the present disclosure are directed to a method, a system, and an article for incentivizing users of an online game. An example computer-implemented method can include: providing an online game on a client device of a user; providing on the client device a first request for content to be presented on the client device; determining that at least a portion of the content has been presented on the client device and, in response, providing the user with a first reward for the online game; providing on the client device a plurality of second requests, wherein each second request comprises a respective task for the user to perform; determining that one of the second requests has been selected and that at least a portion of the respective task has been performed and, in response, providing the user with a respective second reward for the online game.

20 Claims, 5 Drawing Sheets

(51) Int. Cl.
*A63F 13/48* (2014.01)
*A63F 13/23* (2014.01)
*A63F 13/49* (2014.01)
*A63F 13/67* (2014.01)
*A63F 13/33* (2014.01)

(52) U.S. Cl.
CPC .............. *A63F 13/49* (2014.09); *A63F 13/67* (2014.09); *A63F 2300/1025* (2013.01); *A63F 2300/535* (2013.01)

(58) Field of Classification Search
USPC ........................................................... 463/9
See application file for complete search history.

(56) References Cited

U.S. PATENT DOCUMENTS

| | | | |
|---|---|---|---|
| 2004/0002355 A1 | 1/2004 | Spencer | |
| 2005/0187015 A1 | 8/2005 | Suzuki et al. | |
| 2008/0248849 A1 | 10/2008 | Lutnick et al. | |
| 2009/0131141 A1 | 5/2009 | Walker et al. | |
| 2010/0041481 A1 | 2/2010 | Smedley et al. | |
| 2010/0099494 A1 | 4/2010 | Dohta et al. | |
| 2010/0173702 A1 | 7/2010 | Van Luchene | |
| 2010/0306055 A1* | 12/2010 | Kolb ...................... | G06Q 30/02 705/14.55 |
| 2012/0035990 A1* | 2/2012 | Lewis ................ | G06Q 30/0207 705/14.1 |
| 2012/0129610 A1 | 5/2012 | Mazursky et al. | |
| 2012/0289330 A1 | 11/2012 | Leydon et al. | |
| 2013/0029762 A1* | 1/2013 | Klappert ................ | G06Q 30/02 463/31 |
| 2014/0248943 A1 | 9/2014 | Burgin et al. | |
| 2014/0274307 A1* | 9/2014 | Gonzalez .............. | A63F 13/655 463/25 |
| 2014/0358651 A1* | 12/2014 | Koh ................... | G06Q 30/0209 705/14.12 |
| 2017/0004678 A1 | 1/2017 | Leydon et al. | |

OTHER PUBLICATIONS

Int'l Search Report and Written Opinion of the ISA/EP in PCT/US2018/014851; dated Mar. 15, 2018; 13 pgs.

Int'l Search Report and Written Opinion of the ISA/US in PCT/US2012/037789; dated Aug. 14, 2012; 8 pages.

U.S. Appl. No. 13/471,129, filed May 14, 2012, Systems and Methods for A Support Game, Leydon et al.

U.S. Appl. No. 15/265,397, filed Sep. 14, 2016, Systems and Methods for Generating Measureable Units for Use Within a Virtual Environment by Interacting With Rewarded Units, Leydon et al.

* cited by examiner

SYSTEM AND METHOD FOR MANAGING DYNAMIC OPT-IN EXPERIENCES IN A VIRTUAL ENVIRONMENT

CROSS-REFERENCE TO RELATED APPLICATIONS

This application claims the benefit of U.S. Provisional Patent Application No. 62/449,851, filed Jan. 24, 2017, and U.S. Provisional Patent Application No. 62/474,843, filed Mar. 22, 2017, the entire contents of each of which are incorporated by reference herein.

BACKGROUND

The present disclosure relates generally to online computer games and, in some examples, to systems and methods for incentivizing users of an online game to perform tasks in exchange for earning rewards in the online game.

In general, online games can be played by hundreds of thousands or even millions of players who use client devices to interact with a virtual environment for the online game. The players are typically working to accomplish tasks, acquire assets, or achieve a certain score or level in the online game. Some games require or encourage players to form groups or teams that can play against other players or groups of players.

In a typical example, a player interacts with the virtual environment by providing input to a user input device. Common user input devices for games can include, for example, a touch screen, a keypad, a joystick, and/or a keyboard. With a touch screen, users can interact with the virtual environment by tapping or selecting items displayed on the screen.

SUMMARY

In general, the subject matter described herein can be used to incentivize users to more deeply engage with an online game (e.g., a multi-player online game and/or a single-player online game) by providing opportunities for the users to earn rewards for the online game. To earn the rewards, for example, a user can be presented with a first request to view or experience content on a client device. The user can receive the first reward by viewing or experiencing the content. During or after the content presentation, the user can receive a plurality of second requests that provide the user with opportunities to earn a second reward in exchange for performing a task associated each request. The user can receive the second reward by performing one of the tasks.

Advantageously, the systems and methods described herein can result in more user engagement with the online game. Users can become better informed about the online game and can receive rewards that help the user advance in the online game. In general, this can result in users playing the game more frequently and/or can encourage new users to join the online game.

In one aspect, the subject matter described in this specification relates a method. The method includes: providing an online game on a client device of a user; providing on the client device a first request for content to be presented on the client device; determining, by one or more computer processors, that the first request has been accepted on the client device and, in response: determining, by the one or more computer processors, that at least a portion of the content has been presented on the client device; and providing the user with a first reward for the online game; providing on the client device a plurality of second requests, wherein each second request includes a respective task for the user to perform; and determining, by the one or more computer processors, that one of the second requests has been selected on the client device and, in response: determining, by the one or more computer processors, that at least a portion of the respective task for the selected second request has been performed; and providing the user with a respective second reward for the online game.

In certain examples, providing the first request includes offering the first reward in exchange for presenting the content on the client device. The content can include a video, an image, audio, text, a support game, or any combination thereof. Presenting the content on the client device can include pausing or terminating a presentation of the online game on the client device. The first reward can include a virtual item, virtual currency, an extra life, an ability to replay a level, a level increase, or any combination thereof.

In some implementations, the plurality of second requests are provided at one or more intervals while the content is presented on the client device. Providing the plurality of second requests can include offering the respective second reward in exchange for completing the respective task. Alternatively or additionally, providing the plurality of second requests can include presenting a rewarded dynamic endcard or a dynamic offer wall. Each respective task can be related to the content. The respective second reward can include a virtual item, virtual currency, an extra life, an ability to replay a level, a level increase, or any combination thereof.

In another aspect, the subject matter described in this specification relates a system. The system includes one or more computer processors programmed to perform operations including: providing an online game on a client device of a user; providing on the client device a first request for content to be presented on the client device; determining that the first request has been accepted on the client device and, in response: determining that at least a portion of the content has been presented on the client device; and providing the user with a first reward for the online game; providing on the client device a plurality of second requests, wherein each second request includes a respective task for the user to perform; and determining that one of the second requests has been selected on the client device and, in response: determining that at least a portion of the respective task for the selected second request has been performed; and providing the user with a respective second reward for the online game.

In certain examples, providing the first request includes offering the first reward in exchange for presenting the content on the client device. The content can include a video, an image, audio, text, a support game, or any combination thereof. Presenting the content on the client device can include pausing or terminating a presentation of the online game on the client device. The first reward can include a virtual item, virtual currency, an extra life, an ability to replay a level, a level increase, or any combination thereof.

In some implementations, the plurality of second requests are provided at one or more intervals while the content is presented on the client device. Providing the plurality of second requests can include offering the respective second reward in exchange for completing the respective task. Alternatively or additionally, providing the plurality of second requests can include presenting a rewarded dynamic endcard or a dynamic offer wall. Each respective task can be related to the content. The respective second reward can include a virtual item, virtual currency, an extra life, an ability to replay a level, a level increase, or any combination thereof.

In another aspect, the subject matter described in this specification relates an article. The article includes a non-transitory computer-readable medium having instructions stored thereon that, when executed by one or more computer processors, cause the computer processors to perform operations including: providing an online game on a client device of a user; providing on the client device a first request for content to be presented on the client device; determining that the first request has been accepted on the client device and, in response: determining that at least a portion of the content has been presented on the client device; and providing the user with a first reward for the online game; providing on the client device a plurality of second requests, wherein each second request includes a respective task for the user to perform; and determining that one of the second requests has been selected on the client device and, in response: determining that at least a portion of the respective task for the selected second request has been performed; and providing the user with a respective second reward for the online game.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
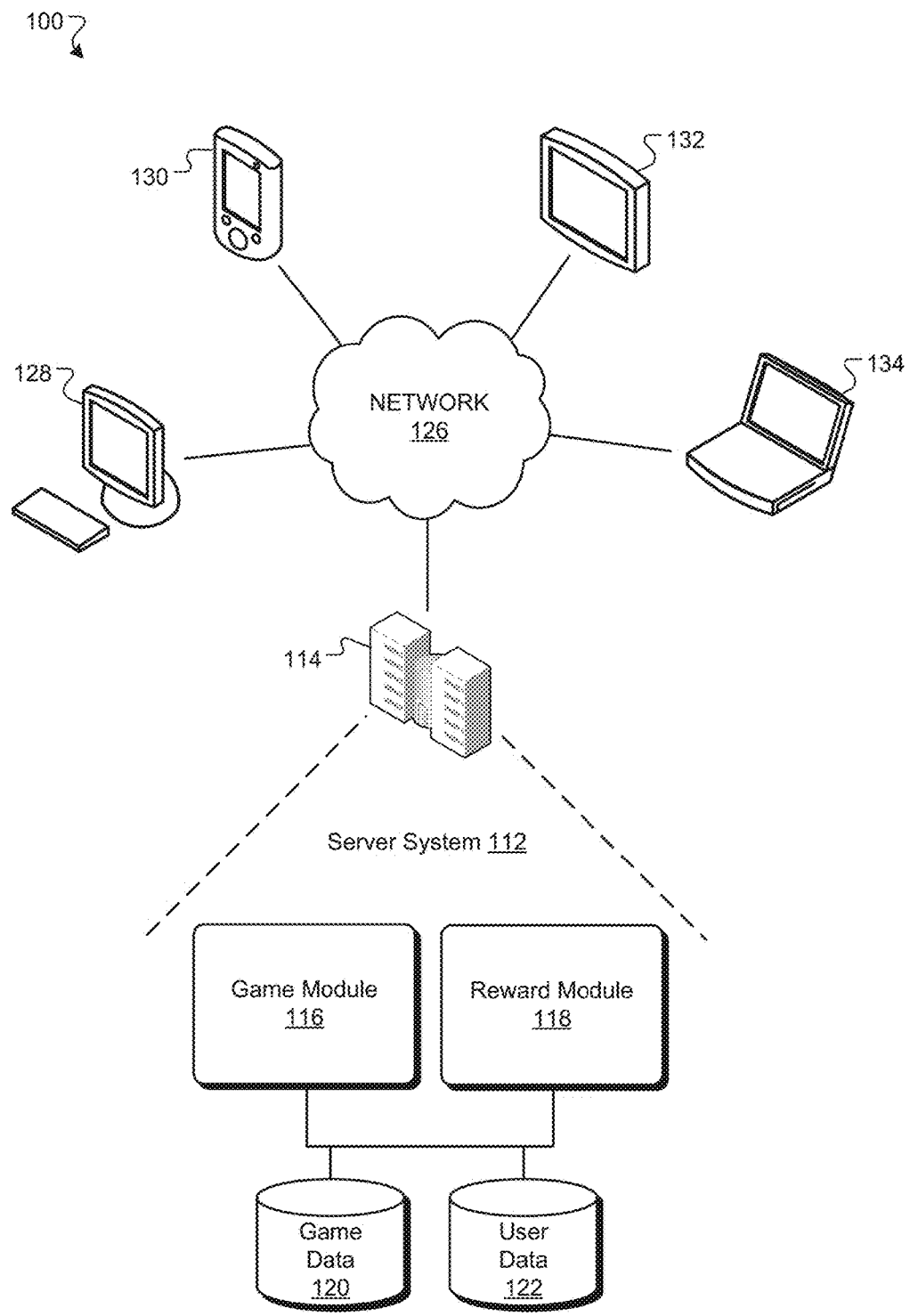
FIG. 1 is a schematic diagram of an example system for incentivizing users of an online game.

FIG. 1 illustrates an example system 100 for providing rewards to users of an online game (e.g., a multi-player online game and/or a single-player online game) through the use of dynamic opt-in experiences. A server system 112 provides functionality for providing an online game that includes a virtual environment for a plurality of users. The server system 112 includes software components and databases that can be deployed at one or more data centers 114 in one or more geographic locations, for example. The server system 112 software components can include a game module 116 and a reward module 118. The software components can include subcomponents that can execute on the same or on different individual data processing apparatus. The server system 112 databases can include game data 120 and user data 122 databases. The databases can reside in one or more physical storage systems. The software components and data will be further described below.

An application, such as, for example, a web-based application, can be provided as an end-user application to allow users to interact with the server system 112. The end-user application can be accessed through a network 126 (e.g., the Internet) by users of client devices, such as a personal computer 128, a smart phone 130, a tablet computer 132, and a laptop computer 124. Other client devices are possible. In alternative examples, the game data 120 and/or the user data 122 or any portions thereof can be stored on one or more client devices. Additionally or alternatively, software components for the system 100 (e.g., the game module 116 and/or the reward module 118) or any portions thereof can reside on or be used to perform operations on one or more client devices.

FIG. 1 depicts the game module 116 and the reward module 118 as being able to communicate with the databases (e.g., the game data 120 and the user data 122 databases). The game data 120 database generally includes information related to the online game implemented using the system 100. The game data 120 database can include, for example, information related to a virtual environment for the game, image, video and/or audio data for the game, event data corresponding to previous, current or future game events, and/or game state data defining a current state of the game. The user data 122 database generally includes data related to user interactions with the online game and/or the virtual environment. Such information can be or include, for example, a history of user connections to the system 100, user purchases, user accomplishments, user tasks, user interactions with other users (e.g., group chats), user virtual item acquisition or usage, and/or other user conditions in the virtual environment and/or real world. The user data 122 database can include information related to user interactions with dynamic opt-in experiences and any rewards obtained by users for the online game.

In various examples, the users or players of the online game can have certain user capabilities in the virtual environment. The user capabilities can be or include, for example, moving an avatar or a virtual item or object to a different location, interacting with characters or other users, participating in user groups or alliances, attacking other users, deploying troops, defending against an attack from other users, deploying defenses, building or modifying a virtual item or object (e.g., a virtual building or other structure), developing a new skill, operating a vehicle, acquiring a virtual item (e.g., a weapon), using or interacting with a virtual item (e.g., a playing card or a weapon), and performing supernatural tasks (e.g., casting a spell). Other user capabilities are possible.

The virtual environment for the online game can be rendered for users in the form of, for example, graphics, images, video, audio, text, and/or haptic feedback. In an adventure game, for example, a graphical user interface can display a virtual environment that includes representations of characters (e.g., people or animals), natural features (e.g., mountains, rivers, fields, trees, and/or weather conditions), and/or man-made features (e.g., buildings, bridges, and/or vehicles).

Figure 2:
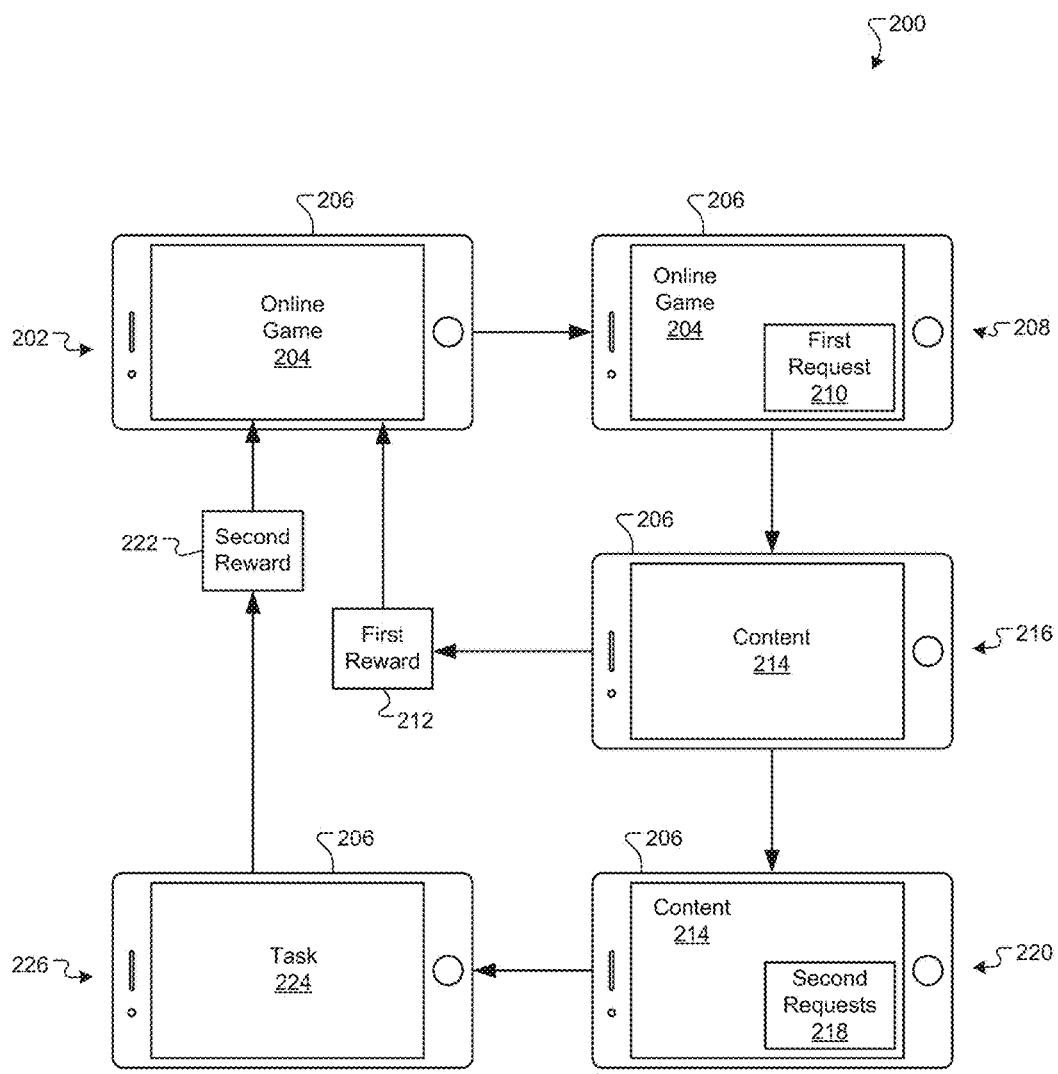
FIG. 2 is a schematic diagram of an example method of incentivizing users to experience content and/or perform tasks in exchange for earning rewards in an online game.

In various examples, the reward module 118 is used to incentivize or encourage a user of the online game (e.g., a massively multiplayer online game or any other suitable online game) to view content and/or perform one or more tasks in exchange for receiving one or more rewards for use in the online game. Referring to FIG. 2, for example, an example method 200 of incentivizing a user can involve providing, at step 202, an online game 204 on a client device 206. At step 208, a first request 210 can be presented on the client device 206. The first request 210 can be or include, for example, an offer for the user to earn a first reward 212 in exchange for viewing or interacting with content 214 on the client device 206. The content 214 can be or include, for example, a video, an image, audio, text, and/or a support game (e.g., a separate game that can be related or unrelated to the online game). When the first request 210 is accepted on the client device 206, the online game 204 can be terminated or paused and the content 214 can be presented on the client device 206, as shown at step 216. After the content 214 (or a portion thereof) has been presented on the client device 206 and/or the user has interacted with the content 214, the first reward 212 can be provided to the user.

In certain implementations, before or at an end of the content presentation, a plurality of second requests 218 can be presented on the client device 206, as shown at step 220. Each of the second requests 218 can include an opportunity for the user to earn a second reward 222 for use in the online game 204 by performing a task 224. When the user selects one of the second requests 218, the user can perform the associated task and receive the second reward 222, as shown at step 226. Alternatively, if the user does not accept any of the second requests 218, or fails to complete the task 224, the user can be returned to the online game 204, without earning the second reward 222. In various examples, the presentation of the second requests 218 can be referred to herein as a dynamic opt-in experience, in which the user is presented with an ability to opt into or otherwise initiate a task or other experience to obtain a reward if the user completes (wholly or partially) the task or experience. The dynamic opt-in experience can be presented to the user in the form of an offer wall and/or an endcard, which can be static or dynamic, as described herein.

In various examples, the dynamic opt-in experience can be configured to get, entice, or incentivize the user to opt into or otherwise initiate an opportunity to obtain the second reward 222. The dynamic opt-in experience can be adapted into various configurations to serve different environments and objectives, which can depend on, for example, the users being targeted, the types of offers (and accompanying rewards) being made, and the like.

In various examples, the first reward 212 and/or the second reward 222 can be or include virtual currency, a virtual item, an extra life, an ability to replay a level, or some other benefit or gain that can be used in or with the online game 204. For example, in some instances, the first reward 212 and/or the second reward 222 can be or include a subscription for the online game 204 or other application or service. Additionally or alternatively, the first reward 212 and/or the second reward 222 can be or include an ability to play the online game 204 or use a different application without receiving any advertisements or other third party notifications. In alternative instances, however, the first reward 212, the second reward 222, or portions thereof may not be suitable for use with the online game 204 or corresponding virtual environment but may instead be suitable for use with a different online game or a different virtual environment. The first reward 212 and/or the second reward 222 could be or include, for example, any suitable non-virtual (e.g., "real world") currency or item or other "real world" reward (e.g., a complimentary product or service at a business) that can be usable in or otherwise associated with either the online game 204 or a different online game or virtual environment. Consequently, the first reward 212 and/or the second reward 222 can be or include any suitable virtual or physical reward that can be used inside or outside the online game 204 or corresponding virtual environment.

Such rewards can be temporary (e.g., exist for one game session) or permanent (e.g., exist for all future game sessions).

In various examples, the reward module 118 can determine an appropriate first request 210 and/or second requests 218 to provide to the user. For example, the reward module 118 can consider historical user interactions with previous requests to predict a likelihood that the user will select the first request 210 and/or one of the second requests 218. The reward module 118 can choose the first request 210 and/or the second requests 218 based on the predicted likelihood of selection by the user. In some instances, the reward module 118 can include or utilize a server that is adapted for the purpose of choosing requests to provide to users. The reward module 118 can belong to or be controlled by an operator of the online game 204 or some other third party.

Still referring to FIG. 2, when the user selects the first request 210, the associated content (e.g., a video or a support game) can be presented on the client device 206, as shown at step 216, which can involve terminating or pausing the online game 204 or a presentation of the online game 204 on the client device 206. The user can then view or engage with the content 214 (e.g., watch the video or play the support game) to earn the first reward 212. Depending on a length of involvement required for the user to complete the content experience, the user may be able to earn a partial reward for completing a portion of the content experience. For example, if a user is required to watch a 10-minute video to obtain a complete first reward 212, the user might be presented with an option to stop the video after two minutes to obtain a portion of the first reward 212. Additionally or alternatively, the user can be offered additional opportunities (e.g., the second requests 218) to complete for further rewards, and each opportunity can have a different reward, as described herein.

Once the content 214 has been presented on the client device 206 and/or the user has interacted with the content 214, at least partially, the reward module 118 can inform the online game 204 (e.g., the game module 116) that the user has earned the first reward 212, and the user can be given the first reward 212 (e.g., the first reward 212 can be credited to an account for the user in the online game 204). In some examples, the reward module 118 can inform the online game 204 with assistance from a network that can reside between a provider of the online game 204 and a provider of the content 214 (e.g., the video or the support game). For example, a software development kit for the network can be integrated into the reward module 118 and/or can otherwise provide functions to confirm that the user has met the requirements for the first reward 212 or a portion thereof. Alternatively or additionally, the providers of the online game 204 and/or the content 214 can use other suitable methods to track such information.

At any suitable time during the presentation of the content 214, the user can be presented with the second requests 218 (e.g., in the form of a rewarded endcard or an offer wall). The second requests 218 can be presented to the user at a beginning of the content 214 or at any time during the presentation of the content 214. For example, if the user is required to watch a 30 second video to earn the first reward 212, a small rewarded endcard or offer wall could be overlayed or superimposed on the content 214, from at or near a beginning portion of the content 214, that informs the user about the availability of the second requests 218 and/or the available second rewards 222. The user can ignore the second requests 218 and, in that case, can be returned to the online game 204 once the presentation of the content 214 is over.

Depending on a length of involvement required for the user to complete the task 224 associated with the chosen second request 218, the user may be able to earn a portion of the second reward 222 for completing a portion of the task 224. For example, if the task 224 requires the user to advance to level 10 in the online game 204, the user may be able to receive a partial second reward 222 upon reaching level 8 in the online game 204. Additionally or alternatively, each second request 218 can be associated with a unique task and/or a unique reward that can be earned upon completion of the task 224. In one instance, for example, the multiple second requests 218 can involve the following tasks: (i) installing an application for an online game and advancing to level 5; (ii) installing the application for the online game and advancing to level 10; or (iii) installing the application for the online game and advancing to level 15. Other tasks are possible. Such second requests 218 can enable the user to decide to complete level 5, 10 or 15, and each of these tasks can have a different second reward 222 that preferably increases with task difficulty. Such an example can be referred to as a progressive payout, in which the second requests 218 have predetermined rewards and predetermined difficulties or milestones, and the payouts can increase with increasing difficulties, milestones, lengths, and/or other like characteristics of the associated task.

Figure 3:
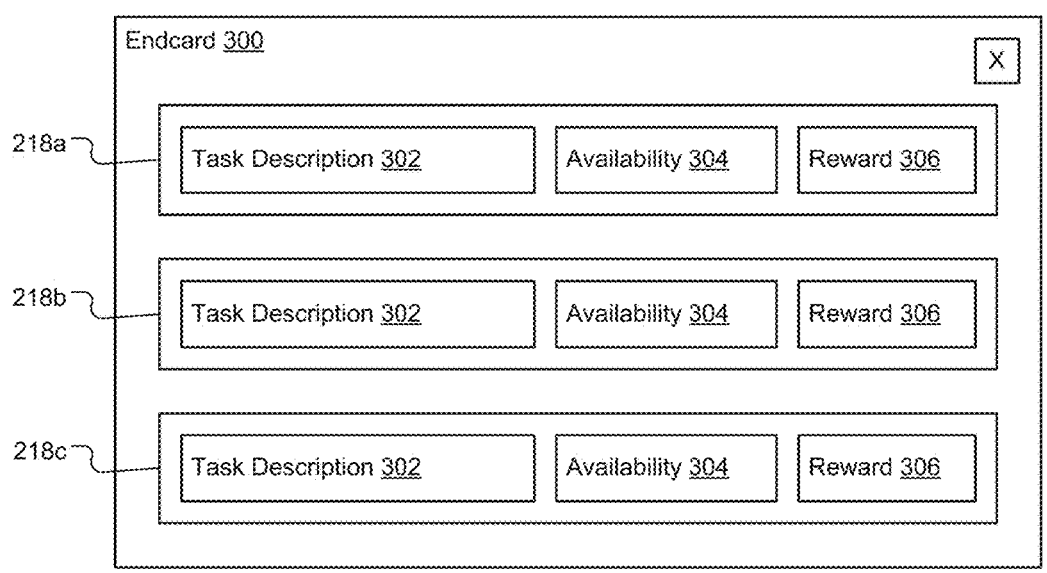
FIG. 3 is a schematic diagram of an example rewarded endcard for an online game.

For purposes of illustration and not limitation, an example illustration of a rewarded endcard 300 is provided in FIG. 3. The rewarded endcard 300 includes a plurality of second requests 218a, 218b, and 218c that may be relevant to the user, the provider of the online game 204, and/or a third party, such that partial or complete interaction or engagement with the rewarded endcard 300 can result in the user receiving the second reward 222. Any suitable number and/or type of second requests can be displayed or otherwise presented to the user in a rewarded endcard 300. For example, the second requests 218a, 218b, and 218c could include one or more support games, mini-games, other interactive content, or tasks that the user can interact with or perform to earn the second reward 222. In general, any suitable use of text, images, videos, interactive playables or interactive rewarded playable units, or any appropriate combination thereof can be displayed or otherwise presented to the user via the rewarded endcard 300.

In general, each of the second requests 218a, 218b, and 218c can require the user to perform one or more tasks 224 before receiving the second reward 222. For example, a selected second request may require the user to download and/or use a new application (e.g., for a different online game). The user can perform the task 224, for example, by visiting an online store or website that provides the application for download. Alternatively, the user may be able to perform the task 224 without leaving the online game 204 or website or application associated with the online game, such that the task 224 can be performed without having to engage directly with a different third party website or application. For example, the third party website or application (or portions or aspects thereof) can be integrated into the website or application for the online game 204. If a third party is requesting information about the user, for example, the third party could rely on the online game provider to obtain any required information from the user, who can then authorize the online game provider to share the information with the third party. This approach can provide a more native or convenient experience for the user, given that the user does not need to leave the website or application for the online game 204.

Once the user completes the task 224 associated with the selected second request, the online game 204 can be informed that the user has earned the second reward 222, and the second reward 222 can be provided to the user. The user can then be returned to the website or application for the online game 204, if desired, or can be allowed to remain on the third party's website or application.

In various examples, the rewarded endcard 300 can be either static or dynamic. With a static endcard, the displayed requests preferably do not change while the endcard is displayed to the user. Consequently, the user may not see any changes in or to the requests or information in the static endcard unless the user leaves or closes the static endcard and is presented with a different static endcard, for example, after returning for another session. With a dynamic endcard, however, some or all of the displayed requests can change over time while the endcard is displayed to the user. Consequently, the dynamic endcard can be periodically revised with new or updated requests for the user, without requiring the user to close the endcard and obtain a different endcard.

For example, when the endcard 300 is a dynamic endcard, information included in the second requests 218a, 218b, and 218c can change over time while the endcard is being displayed on the client device 206. For purposes of illustration and not limitation, the information in each request that can change can include, for example, a task description 302, an availability description 304 (e.g., "only 12 more available"), a reward amount 306, and/or other like information. In certain implementations, the reward amount 306 for a request can change over time (e.g., the reward can increase or decrease in value), for example, according to whether other users have been accepting the request or a similar request. Likewise, the availability description 304 of a request can change over time, for example, as other users accept the request or a similar request. Additionally or alternatively, a request can move up or down in position or rank in the listing (e.g., second request 218a and second request 218c can switch places). Such movements can be accompanied by appropriate messaging in real-time to the user that one request has become more attractive relative to another request. Other changes in, to, and among the displayed second requests 218a, 218b, and 218c in the dynamic rewarded endcard are possible. For example, one or more displayed requests can be removed or added, over time. During a first period of time, for example, requests A, B, C, D, and E can be presented to the user in a dynamic rewarded endcard. During a second period of time, however, while the dynamic rewarded endcard is still being displayed to the user, requests A, C, E, F, and G can be displayed to the user. In this case, requests B and D were removed and new requests F and G were added.

Additionally or alternatively, the payouts or reward amounts 306 in the various requests can be dynamic or can otherwise change based on, for example, information or characteristics of the users. For instance, if it is known that a user of the online game 204 is at a beginner level (e.g., level 1) of the online game 204, then it is likely that a minimal reward is all that is required to move the player to a higher level (e.g., level 2). Consequently, the reward amounts 306 presented to such a user in the dynamic rewarded endcard 300 can be of minimal value or of relatively small payout. If, however, another user of the online game 204 is at a high level (e.g., level 50) of the online game 204, then it is likely that a much larger reward amount 306 is required to move the player to a subsequent level, as it may take a far larger payout to be attractive or relevant as the user progresses in the online game 204. Accordingly, the reward amounts 306 presented in the second requests 218a, 218b, and 218c to an advanced user in the dynamic rewarded endcard 300 can be of significant value or can include a much greater payout. The payouts or reward amounts 306 in one or more of the second requests 218a, 218b, and 218c can be dynamically updated in the dynamic rewarded endcard 300 based on other suitable information or characteristics of the user, such as, for example, time spent by the user in the online game 204, amount of money previously spent by the user in the online game 204, whether or not the user has previously interacted with one or more dynamic rewarded endcards, and other like information.

Thus, not only can the information contained in one or more second requests 218a, 218b, and 218c change over time, but the task descriptions 302 displayed in the dynamic rewarded endcard 300 can also change. The task descriptions 302 can change for any suitable reason and/or at any time, such as, for example, automatically at predefined time intervals or randomly at any time. In some examples, a task description 302 can change when the associated request does not get a response within a certain period of time (e.g., to make the request more attractive). Alternatively or additionally, task descriptions 302 can change in response to feedback obtained from similar requests displayed to other users. Task descriptions 302 can change in response to market conditions for the associated request, for example, based on changes made to other requests that make the other requests more or less attractive. In general, changes to a task description 302 can include changes to text, images, audio, and/or video presented in the task description 302.

In some examples, one or more classifiers or other predictive models (e.g., regression models) can be used to determine appropriate payouts or reward amounts for users, according to various user parameters. For example, a classifier can be trained with training data that includes parameters associated with users (e.g., a user level, a user history with the online game, or a user history for previous offers), requests (e.g., payouts, rewards, and/or task descriptions), and/or data related to request success (e.g., a frequency with which requests were selected by users). The trained classifier or other predictive model can be used to predict request parameters (e.g., payouts and/or rewards) that are likely to be of interest to users. Predicted request parameters can be presented to users in offer walls and/or endcards, as described herein.

In general, an offer wall can be located somewhere in the game 204 (e.g., at one or more points or other fixed locations in time or space) and/or can be accessed by the user through a suitable game menu. In contrast to the rewarded endcard 300, the user generally must proactively search for the offer wall to be able to locate and/or interact with the offer wall.

Figure 4:
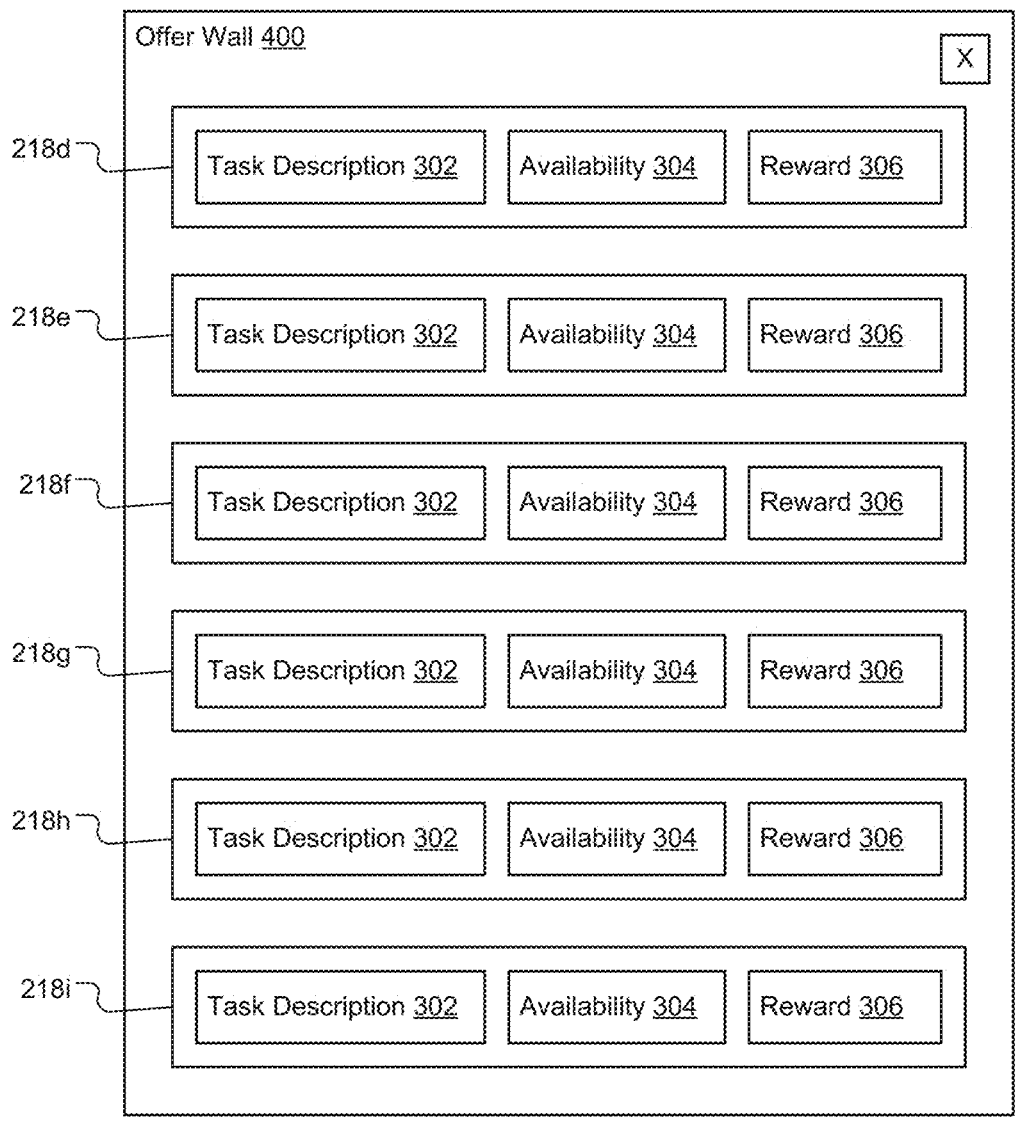
FIG. 4 is a schematic diagram of an example offer wall for an online game.

Referring to FIG. 4, in certain examples, the dynamic opt-in experience can be presented to the user in the form of an offer wall 400 that includes a plurality of second requests 218d, 218e, 218f, 218g, 218h, and 218i (although any suitable number and/or type of second requests can be displayed or otherwise presented to the user in an offer wall 400), and can be either static or dynamic. When the offer wall 400 is static, the second requests 218d, 218e, 218f, 218g, 218h, and 218i typically do not change while the offer wall 400 is being displayed for the user. Consequently, the user may not see any changes in or to the second requests 218d, 218e, 218f, 218g, 218h, and 218i without leaving or closing the offer wall and then returning to access or open another, potentially different, offer wall. By contrast, when the offer wall 400 is dynamic, the second requests 218d, 218e, 218f, 218g, 218h, and 218i can change over time while the dynamic offer wall 400 is being displayed for the user. Consequently, the user may not need to leave the offer wall 400 and return for another session to see changes in or to the second requests 218d, 218e, 218f, 218g, 218h, and 218i in the offer wall 400.

For example, when the offer wall 400 is a dynamic offer wall, information included in the second requests 218d, 218e, 218f, 218g, 218h, and 218i can change over time while the offer wall 400 is being displayed for the use. For purposes of illustration and not limitation, the information in each request that can change could include, for example, the task description 302, the availability description 304 (e.g., "only 12 more available"), the reward amount 306, and/or other like information. In certain implementations, the reward amount 306 for a request can change over time (e.g., the reward can increase or decrease in value), for example, according to whether other users have been accepting the request or a similar request. Likewise, the availability description 304 of a request can change over time, for example, as other users accept the request or a similar request. Additionally or alternatively, a request can move up or down in position or rank in the listing (e.g., second request 218d and second request 218f can switch places). Such movements can be accompanied by appropriate messaging in real-time to the user that one request has become more attractive relative to another request. Other changes in, to, and among the displayed second requests 218d, 218e, 218f, 218g, 218h, and 218i in the dynamic offer wall 400 are possible. For example, one or more displayed requests can be removed or added, over time. During a first period of time, for example, requests A, B, C, D, and E can be presented to the user in a dynamic offer wall 400. During a second period of time, however, while the dynamic offer wall 400 is still being displayed to the user, requests A, C, E, F, and G can be displayed to the user. In this case, requests B and D were removed and new requests F and G were added.

Additionally or alternatively, the payouts or reward amounts 306 in the various requests can be dynamic or can otherwise change based on, for example, information or characteristics of the users. For instance, if it is known that a user of the online game 204 is at a beginner level (e.g., level 1) of the online game 204, then it is likely that a minimal reward is all that is required to move the player to a higher level (e.g., level 2). Consequently, the reward amounts 306 presented to such a user in the offer wall 400 can be of minimal value or of relatively small payout. If, however, another user of the online game 204 is at a high level (e.g., level 50) of the online game 204, then it is likely that a much larger reward amount 306 is required to move the player to a subsequent level, as it may take a far larger payout to be attractive or relevant as the user progresses in the online game 204. Accordingly, the reward amounts 306 presented in the second requests 218d, 218e, 218f, 218g, 218h, and 218i to an advanced user in the offer wall 400 can be of significant value or can include a much greater payout. The payouts or reward amounts 306 in one or more of the second requests 218d, 218e, 218f, 218g, 218h, and 218i can be dynamically updated in the offer wall 400 based on other suitable information or characteristics of the user, such as, for example, time spent by the user in the online game 204, amount of money previously spent by the user in the online game 204, whether or not the user has previously interacted with one or more offer walls, and other like information.

Thus, not only can the information contained in one or more second requests 218*d*, 218*e*, 218*f*, 218*g*, 218*h*, and 218*i* change over time, but the task descriptions 302 displayed in the offer wall 400 can also change. The task descriptions 302 can change for any suitable reason and/or at any time, such as, for example, automatically at predefined time intervals or randomly at any time. In some examples, a task description 302 can change when the associated request does not get a response within a certain period of time (e.g., to make the request more attractive). Alternatively or additionally, task descriptions 302 can change in response to feedback obtained from similar requests displayed to other users. Task descriptions 302 can change in response to market conditions for the associated request, for example, based on changes made to other requests that make the other requests more or less attractive. In general, changes to a task description 302 can include changes to text, images, audio, and/or video presented in the task description 302.

Figure 5:
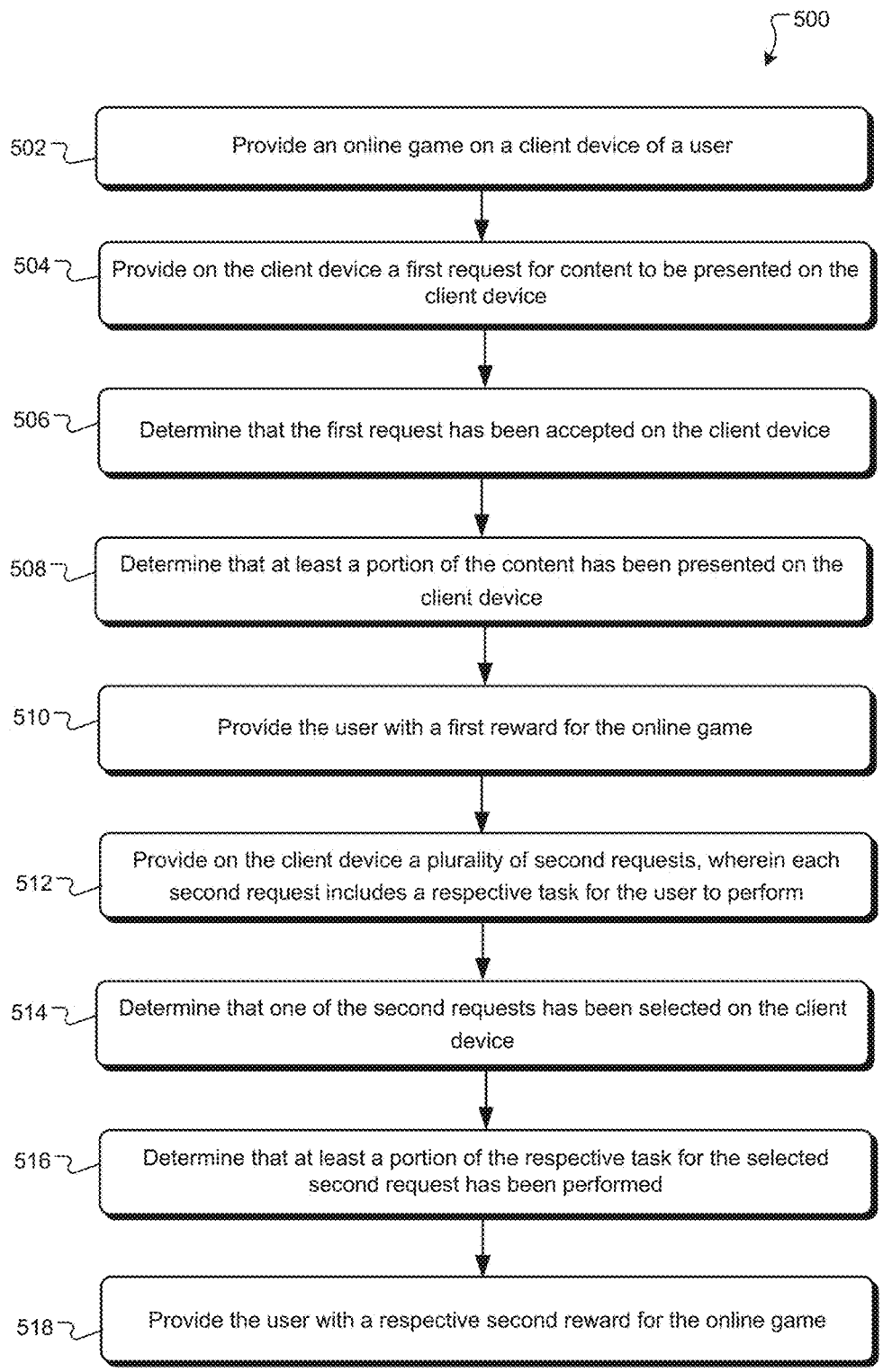
FIG. 5 is a flowchart of an example method of incentivizing users to experience content and/or perform tasks in exchange for earning rewards in an online game.

FIG. 5 illustrates an example computer-implemented method 500 of using an online game to incentivize users to view content and/or perform tasks. An online game is provided (step 502) on a client device of a user. A first request is provided (step 504) on the client device for content to be presented on the client device. After determining (step 506) that the first request has been accepted on the client device, it is determined (step 508) that at least a portion of the content has been presented on the client device, and the user is provided (step 510) with a first reward for the online game. A plurality of second requests are provided (step 512) on the client device, wherein each second request includes a respective task for the user to perform. After determining (step 514) that one of the second requests has been selected on the client device, it is determined (step 516) that at least a portion of the respective task for the selected second request has been performed. Consequently, the user is provided (step 518) with a respective second reward for the online game.

Advantageously, in various examples, the systems and methods described herein can incentivize users to more deeply engage with the online game by providing opportunities for the users to earn rewards for the online game. To earn the rewards, for example, a user can be presented with a first request to view or experience content on a client device in exchange for receiving a first reward. The content can be or include, for example, a video, an image, audio, and/or a support game. The content can include or present subject matter that relates to the online game and/or to topics or subjects unrelated to the online game, such as, for example, a different game (e.g., a support game), an object, an item, a method, and/or a procedure.

During or after the presentation of the content on the client device, a plurality of second requests can be presented on the client device, for example, in the form of an endcard and/or an offer wall. The second requests can be presented on the client device at any time while the content is being presented. For example, the second requests can be presented near a beginning, a middle, or an end of the content presentation on the client device. In some examples, the second requests can be presented after the content has been presented, for example, at an end of the content presentation.

In various examples, the second requests can relate to the subject matter of the content. For example, if the content relates to a specific subject (e.g., the online game or a different online game), the second requests can present information related to the specific subject. Additionally or alternatively, each second request can include an offer for the user to earn an additional reward for the online game in exchange for performing a certain task. In preferred examples, the task can relate to the subject matter of the content. For example, if the content relates to the online game, the task can be something that the user performs in the online game. In preferred implementations, the user can select one of the second requests and can earn a second reward by performing at least a portion of the task associated with the selected request.

In certain implementations, the content and the tasks for the first and second requests can be associated with the online game. For example, to improve user interest and ability in the online game, the content can be or include a tutorial that describes how to perform one or more tasks in the online game. Additionally or alternatively, the second requests can relate to the one or more tasks in the online game. As a simple example, the content could be or include a video that describes how a user can use a virtual object in the online game. After watching the video, the user can select a second request that provides the user with a reward for using the virtual object as described in the video. In this way, the user can earn an initial reward for viewing the content and a second reward by performing a task related to the content.

Advantageously, this approach of providing an incentive for users to view content and then perform a task associated with the content can result in more user engagement with the online game or other topic. Users can become better informed about the online game or other topic and, after completing the associated task, can receive rewards that help the user in the online game. The approach can result in greater interest in the online game by teaching users how to perform certain tasks in the online game. By improving user knowledge of the game and user ability in the game, users generally become more interested in the online game. User interest is also increased by providing users with rewards that can be used in the online game. In general, this can result in users playing the game more frequently and/or can encourage new users to learn how to play the game more quickly. As interest in the game grows, additional users are likely to learn about the game and become interested in playing the game.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
    providing an online game on a client device of a user;
    providing on the client device a first request for content to be presented on the client device;
    determining, by one or more computer processors, that the first request has been accepted on the client device and, in response:
        determining, by the one or more computer processors, that at least a portion of the content has been presented on the client device; and
        providing the user with a first reward for the online game;
    providing on the client device a plurality of second requests while the content is being presented on the client device,
        wherein each second request comprises a respective task for the user to perform, and
        wherein at least one of the tasks comprises installing and using a new software application; and
    determining, by the one or more computer processors, that one of the second requests has been selected on the client device and, in response:
        determining, by the one or more computer processors, that at least a portion of the respective task for the selected second request has been performed; and
        providing the user with a respective second reward for the online game.

2. The method of claim 1, wherein providing the first request comprises:
    offering the first reward in exchange for presenting the content on the client device.

3. The method of claim 1, wherein the content comprises at least one of a video, an image, audio, text, or a support game.

4. The method of claim 1, wherein presenting the content on the client device comprises:
    pausing a presentation of the online game on the client device.

5. The method of claim 1, wherein the first reward comprises at least one of a virtual item, virtual currency, an extra life, an ability to replay a level, or a level increase.

6. The method of claim 1, wherein the plurality of second requests is provided near a beginning, a middle, or an end of the content presentation on the client device.

7. The method of claim 1, wherein providing the plurality of second requests comprises:
    offering the respective second reward in exchange for completing the respective task.

8. The method of claim 1, wherein providing the plurality of second requests comprises:
    presenting one of a rewarded dynamic endcard and a dynamic offer wall.

9. The method of claim 1, wherein each respective task is related to the content.

10. The method of claim 1, wherein the respective second reward comprises at least one of a virtual item, virtual currency, an extra life, an ability to replay a level, or a level increase.

11. A system, comprising:
    one or more computer processors programmed to perform operations comprising:
        providing an online game on a client device of a user;
        providing on the client device a first request for content to be presented on the client device;
        determining that the first request has been accepted on the client device and, in response:
            determining that at least a portion of the content has been presented on the client device; and
            providing the user with a first reward for the online game;
        providing on the client device a plurality of second requests while the content is being presented on the client device,
            wherein each second request comprises a respective task for the user to perform, and
            wherein at least one of the tasks comprises installing and using a new software application; and
        determining that one of the second requests has been selected on the client device and, in response:
            determining that at least a portion of the respective task for the selected second request has been performed; and
            providing the user with a respective second reward for the online game.

12. The system of claim 11, wherein providing the first request comprises:
    offering the first reward in exchange for presenting the content on the client device.

13. The system of claim 11, wherein the content comprises at least one of a video, an image, audio, text, or a support game.

14. The system of claim 11, wherein presenting the content on the client device comprises:
    pausing a presentation of the online game on the client device.

15. The system of claim 11, wherein the first reward comprises at least one of a virtual item, virtual currency, an extra life, an ability to replay a level, or a level increase.

16. The system of claim 11, wherein the plurality of second requests is provided near a beginning, a middle, or an end of the content presentation on the client device.

17. The system of claim 11, wherein providing the plurality of second requests comprises:
    offering the respective second reward in exchange for completing the respective task.

18. The system of claim 11, wherein providing the plurality of second requests comprises:
    presenting one of a rewarded dynamic endcard and a dynamic offer wall.

19. The system of claim 11, wherein each respective task is related to the content.

20. An article, comprising:
    a non-transitory computer-readable medium having instructions stored thereon that, when executed by one or more computer processors, cause the computer processors to perform operations comprising:
        providing an online game on a client device of a user;
        providing on the client device a first request for content to be presented on the client device;
        determining that the first request has been accepted on the client device and, in response:
            determining that at least a portion of the content has been presented on the client device; and
            providing the user with a first reward for the online game;
        providing on the client device a plurality of second requests while the content is being presented on the client device,
            wherein each second request comprises a respective task for the user to perform, and
            wherein at least one of the tasks comprises installing and using a new software application; and
        determining that one of the second requests has been selected on the client device and, in response:
            determining that at least a portion of the respective task for the selected second request has been performed; and
            providing the user with a respective second reward for the online game.

* * * * *